G. J. MEYER.
SOAKING AND WASHING MACHINE.
APPLICATION FILED AUG. 19, 1918.
1,381,325.
Patented June 14, 1921.
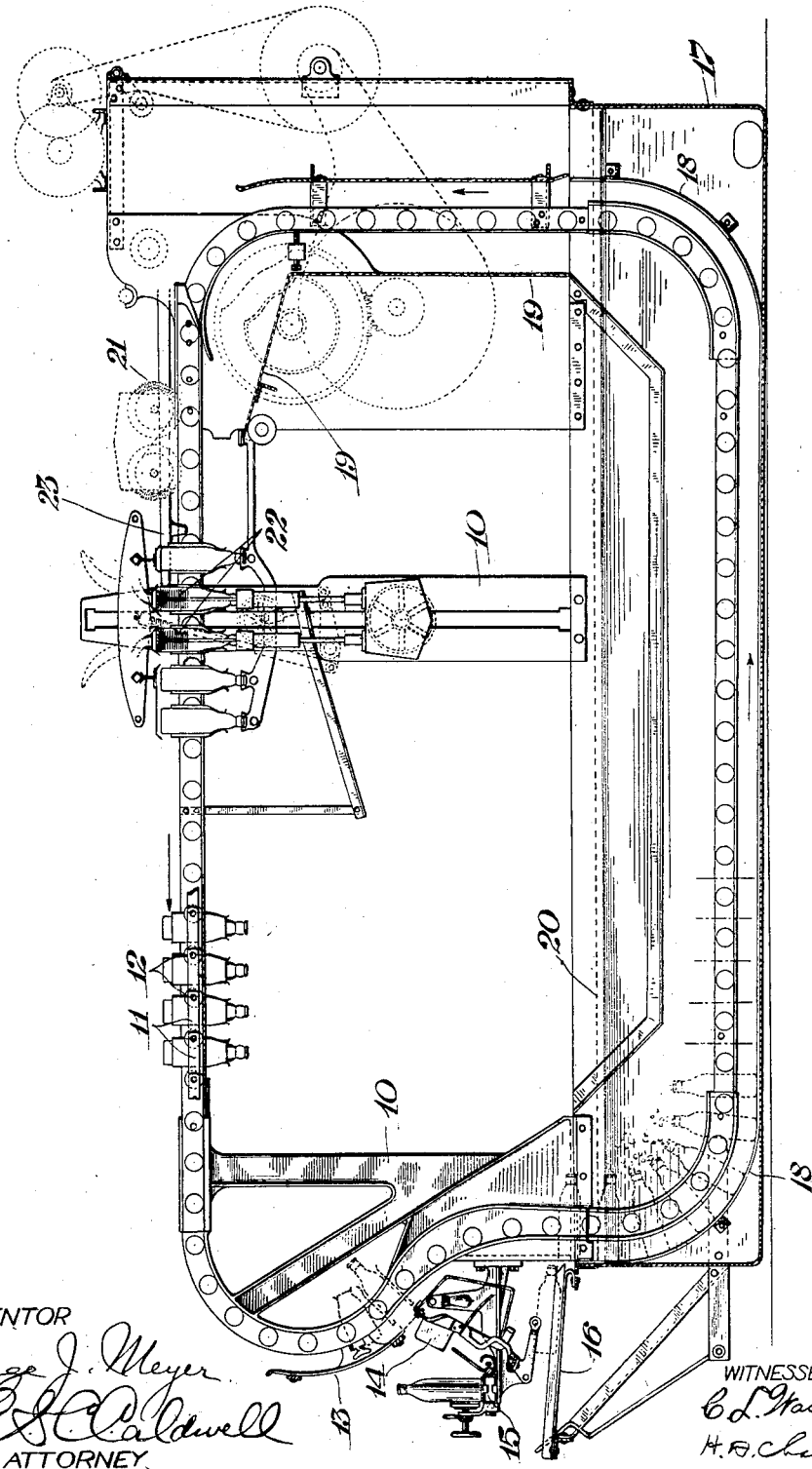
INVENTOR
George J. Meyer
By R. S. Caldwell
ATTORNEY
WITNESSES
C. L. Wool
H. A. Chase

UNITED STATES PATENT OFFICE.

GEORGE J. MEYER, OF MILWAUKEE, WISCONSIN, ASSIGNOR TO GEO. J. MEYER MANUFACTURING COMPANY, OF MILWAUKEE, WISCONSIN, A CORPORATION OF WISCONSIN.

SOAKING AND WASHING MACHINE.

1,381,325. Specification of Letters Patent. Patented June 14, 1921.

Application filed August 19, 1918. Serial No. 250,598.

*To all whom it may concern:*

Be it known that I, GEORGE J. MEYER, a citizen of the United States, and resident of Milwaukee, Milwaukee county, Wisconsin, have invented new and useful Improvements in Soaking and Washing Machines, of which the following is a description, reference being had to the accompanying drawings, which are a part of this specification.

This invention has for its object to provide a bottle cleaning machine which will perform the functions of soaking and washing the bottles in the forward and return travel respectively of the bottle conveyer thereof.

Another object of the invention is to provide a combined soaking and washing machine in which the bottles are loaded and unloaded at substantially the same place.

With the above and other objects in view the invention consists in the bottle cleaning machine as herein claimed and all equivalents.

Referring to the accompanying drawing, the figure represents a longitudinal sectional view of a bottle cleaning machine constructed in accordance with this invention.

In this drawing 10 indicates a frame of suitable construction supporting angle and channel guides 11 on which travel the rollers 12 of conveyer chains, such chains carrying rows of bottle holding pockets in the manner shown in my co-pending application for bottle washing machines, Serial No. 188,415, filed August 27, 1917. Also as in the said application the conveyer is moved intermittently, step by step, by hook means 23 engaging the chains for causing the conveyer to travel in its guides in the direction indicated by arrows. The conveyer has an upper horizontal travel and a lower horizontal travel and at the descending portion of its travel it is given a reverse bend that will cause the bottles held in its pockets to drop as soon as they pass beyond curved guide strips 13 into an electrically lighted inspection chute 14 where they are held momentarily for inspection and then automatically moved onto a discharge conveyer 15. Directly beneath the unloading device is a loading device 16 of suitable construction which may be automatic in its operation or from which the bottles may be fed by hand into the pockets of the conveyer.

The entire lower portion of the conveyer is contained within a soaking tank 17 containing a cleaning solution in which the bottles are soaked during their travel to the ascending portion of the conveyer. Steel strips 18 are provided in the bottom of the tank upon which the bottles slide during their travel through the tank. The bottles enter the solution in a horizontal position and are partly filled thereby. They are then turned to a vertical position, in which they are completely filled. Their intermittent travel through the tank causes agitation of the solution surrounding them and aids in loosening the labels. The bottles leave the solution in an approximately horizontal position so that they remain partly filled and wet until they get to the upper turn. Here they are emptied of the solution which is caught by an inclined guard plate 19 and returned to the tank beyond the end of a rinsing water tank 20 which is contained within the soaking tank 17.

After thorough draining, the bottles are rinsed and raised out of the conveyer pockets and carried between cleaning brushes 21 for outside cleaning, as more particularly shown and described in my copending application Serial No. 188,415 filed August 27, 1917, and then have rotary brushes 22 inserted in them for inside cleaning. The bottles are then rinsed thoroughly as more particularly shown and described in the above mentioned application, and allowed to drain during the remainder of their travel and are practically dry by the time they are discharged at the end of the machine. The rinsing water is caught in the tank 20 and kept separate from the soaking water.

By means of this invention the bottle conveyer does double duty in conducting the bottles through the soaker tank when traveling in one direction and in conducting them through the washing and rinsing mechanism while moving in the opposite direction. In this manner a more efficient cleaning operation is assured with economy of space and convenience in operation as the loading and unloading take place at practically the same point, making it possible for one attendant to control these operations.

What I claim as new and desire to secure by Letters Patent is:

1. A bottle cleaning machine comprising a soaking tank, a conveyer for conducting bottles through said tank and returning above the tank with bottles in an inverted position, bottle washing and rinsing mechanism operating on the bottles on the return travel of the conveyer, said conveyer having a reverse bend at its descending end by which the bottles are discharged therefrom by gravity, means beneath the reverse bend of the conveyer and at the same end of the machine for feeding the bottles to the conveyer for their passage through said soaking tank, and means for guiding the conveyer.

2. A bottle cleaning machine, comprising a soaking tank, angle strips forming conveyer guides extending through the soaking tank from one end to the other and returning above the soaking tank with a reverse bend for the descending end of the conveyer, a conveyer having rollers traveling on said guides and supporting bottle carriers with rows of bottle-receiving pockets, means at the descending portion for feeding bottles to the pockets of the conveyer beneath the reverse bend of the conveyer, guides within the soaking tank engaged by the bottoms of the bottles to hold the bottles within the pockets, guides engaged by the bottles for holding them in the pockets during the ascending travel of the conveyer, bottle washing and rinsing means operating on the bottles during the return travel of the conveyer, guides engaged by the bottles to hold them in their pockets during the travel of the conveyer around a portion of the reverse bend and permitting the bottles to drop out of the pockets when in an inclined position, and means for receiving the bottles as they drop from the conveyer.

In testimony whereof, I affix my signature, in presence of two witnesses.

GEORGE J. MEYER.

Witnesses:
  R. S. C. CALDWELL,
  GEORGE H. BARBER.